(12) United States Patent
Thygesen

(10) Patent No.: US 11,010,568 B2
(45) Date of Patent: May 18, 2021

(54) METHOD FOR DETECTING AN INCIPIENT DAMAGE IN A BEARING

(71) Applicant: Siemens Gamesa Renewable Energy A/S, Brande (DK)

(72) Inventor: Mikkel Wilki Thygesen, Vejle (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/576,248

(22) Filed: Sep. 19, 2019

(65) Prior Publication Data

US 2020/0097686 A1   Mar. 26, 2020

(30) Foreign Application Priority Data

Sep. 21, 2018  (EP) .................................... 18195887

(51) Int. Cl.
| | |
|---|---|
| *G01H 1/00* | (2006.01) |
| *G01M 13/045* | (2019.01) |
| *G06G 7/64* | (2006.01) |

(52) U.S. Cl.
CPC ................ *G06G 7/64* (2013.01); *G01H 1/00* (2013.01); *G01M 13/045* (2013.01)

(58) Field of Classification Search
CPC ............ G06G 7/64; G01H 1/00; G01H 1/003; G01M 13/045; G01M 13/028; G01M 13/021; F16C 19/527
See application file for complete search history.

(56) References Cited

U.S. PATENT DOCUMENTS

| | | | | |
|---|---|---|---|---|
| 3,208,268 A | * | 9/1965 | Tallian ..................... | H03D 1/00 73/593 |
| 3,699,806 A | * | 10/1972 | Weichbrodt ........... | G01H 1/003 73/593 |

(Continued)

FOREIGN PATENT DOCUMENTS

| | | |
|---|---|---|
| CN | 101458158 A | 6/2009 |
| CN | 102105774 A | 6/2011 |

(Continued)

OTHER PUBLICATIONS

European Search Report dated Mar. 27, 2019 for Application No. 18195887.7.

(Continued)

*Primary Examiner* — Helen C Kwok
(74) *Attorney, Agent, or Firm* — Schmeiser, Olsen & Watts LLP

(57) ABSTRACT

Provided is a method for detecting an incipient damage in a bearing including receiving from a plurality of sensors of the bearing a plurality of signals corresponding to a plurality of bursts, each burst being emitted each time an indentation is met during the rotation of the bearing at a contact point between a roller of the bearing and a race of the bearing, analyzing the signals for locating on the bearing the indentations corresponding to the bursts, generating a map of points on a digital model of the bearing corresponding to the indentations on the bearing, the map of points being registered and updated throughout at least an interval of the lifetime of the bearing, identifying an incipient damage in the bearing each time the distribution of the points in the map is not random, and generating an incipient damage warning message.

8 Claims, 3 Drawing Sheets

(56) References Cited

U.S. PATENT DOCUMENTS

| | | | | |
|---|---|---|---|---|
| 4,335,596 A * | 6/1982 | Greiner | | G01R 23/02 |
| | | | | 368/327 |
| 5,677,488 A | 10/1997 | Monahan et al. | | |
| 6,321,602 B1 * | 11/2001 | Ben-Romdhane | | F16C 19/52 |
| | | | | 340/679 |
| 2002/0140566 A1 * | 10/2002 | Holroyd | | G01H 1/003 |
| | | | | 340/679 |
| 2002/0186039 A1 * | 12/2002 | Devaney | | G01M 13/045 |
| | | | | 324/765.01 |
| 2004/0034483 A1 * | 2/2004 | Sonnichsen | | G01M 13/028 |
| | | | | 702/56 |
| 2007/0277613 A1 * | 12/2007 | Iwatsubo | | G01M 13/045 |
| | | | | 73/593 |
| 2009/0093975 A1 * | 4/2009 | Judd | | G01H 13/00 |
| | | | | 702/34 |
| 2010/0030492 A1 * | 2/2010 | Kar | | F16C 19/52 |
| | | | | 702/39 |
| 2010/0071469 A1 * | 3/2010 | Luo | | F16C 19/527 |
| | | | | 73/593 |
| 2011/0219880 A1 | 9/2011 | Klos et al. | | |
| 2012/0330614 A1 * | 12/2012 | Kar | | G01M 7/00 |
| | | | | 702/185 |
| 2013/0096848 A1 * | 4/2013 | Hatch | | G01M 13/045 |
| | | | | 702/39 |
| 2013/0298704 A1 | 11/2013 | Ito et al. | | |
| 2014/0358363 A1 * | 12/2014 | Mavrosakis | | F16C 19/52 |
| | | | | 701/32.7 |
| 2015/0081230 A1 | 3/2015 | Hamilton et al. | | |
| 2016/0033580 A1 * | 2/2016 | Qiao | | F03D 7/0296 |
| | | | | 324/765.01 |
| 2016/0334302 A1 * | 11/2016 | Barikmo | | G01M 13/045 |
| 2016/0334303 A1 | 11/2016 | Thomson et al. | | |
| 2017/0096986 A1 * | 4/2017 | Takeuchi | | F03D 17/00 |
| 2017/0108406 A1 * | 4/2017 | Thomson | | G01H 1/00 |
| 2017/0315516 A1 * | 11/2017 | Kozionov | | G01M 13/045 |
| 2018/0335366 A1 * | 11/2018 | Qiao | | F03D 17/00 |
| 2018/0347548 A1 * | 12/2018 | Potter | | G01M 13/045 |
| 2019/0250066 A1 * | 8/2019 | Guo | | G01M 13/04 |
| 2019/0310164 A1 * | 10/2019 | Chen | | G01M 13/045 |
| 2020/0149585 A1 * | 5/2020 | Epps | | F16C 19/52 |

FOREIGN PATENT DOCUMENTS

| | | |
|---|---|---|
| CN | 104285139 A | 1/2015 |
| CN | 105353996 A | 2/2016 |
| CN | 105899928 A | 6/2016 |
| EP | 1304463 A1 | 4/2003 |
| EP | 1510805 A1 | 3/2005 |

OTHER PUBLICATIONS

Office Action in corresponding Chinese Patent Applicaiton No. 201910892345.5 dated Jan. 18, 2021. 5 pages.

* cited by examiner

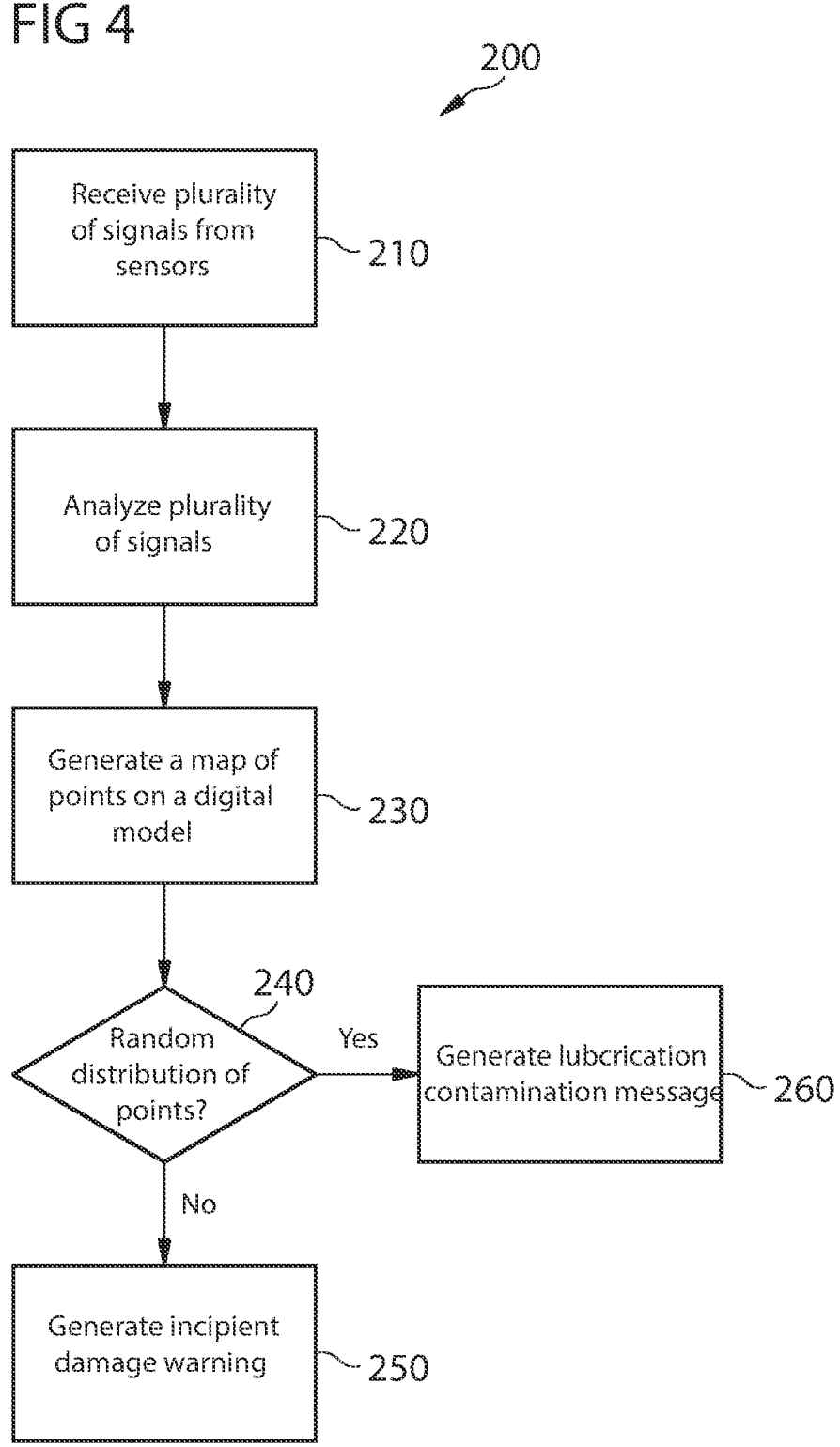

METHOD FOR DETECTING AN INCIPIENT DAMAGE IN A BEARING

CROSS-REFERENCE TO RELATED APPLICATIONS

This application claims priority to European application no. 18195887.7 having a filing date of Sep. 21, 2018, the entire contents of which are hereby incorporated by reference.

FIELD OF TECHNOLOGY

The following relates to a method for detecting an incipient damage in a bearing. Particularly, but not exclusively, the following relates to a method for detecting an incipient damage in a bearing in a wind turbine.

BACKGROUND

In the above defined technical field, bearing failures may be caused by particle contamination in the bearing lubricant.

Particles from within the bearing or foreign objects can form several indentations in the bearing raceway, which can ultimately result in a bearing failure. Additionally, the presence of particles in the bearing can be an indication of unfavourable operating conditions, which in turn generates additional particles.

One approach for detecting the presence of particles could be that of analysing samples of the lubricant grease; however these samples can only provide a snapshot of the grease condition and, additionally, this cannot be done remotely, hence it is costly.

A remote monitoring is essential for practical and cost reasons in certain applications, for example in wind turbines.

Another solution is that of continuously monitoring the bearing by measuring the acoustic emission; however continuous monitoring involves also high costs. Further, known algorithms which are normally used in bearing monitoring are not able to distinguish between a particle contamination, which is at least not yet dangerous, and an incipient bearing failure that could be caused by an excess of particle contamination.

SUMMARY

It is therefore desirable to provide a new reliable method for detecting an incipient damage in a bearing by detecting and differentiating between incipient damages and indentations caused by particle contamination in the lubricant. It is further desirable that such method could be performed remotely without using continuous monitoring.

An aspect relates to a method for detecting an incipient damage in a bearing is provided in accordance to the independent claim.

According to an aspect of the present embodiments of the invention, a computer implemented method for detecting an incipient damage in a bearing comprising the steps of:
receiving from a plurality of sensors on the bearing a plurality of signals corresponding to a plurality of bursts, each burst being emitted each time an indentation is met during the rotation of the bearing at a contact point between a roller of the bearing and a race of the bearing,
analysing said plurality of signals for locating on the bearing the plurality of indentations corresponding to said plurality of bursts,
generating a map of points on a digital model of the bearing corresponding to the plurality of indentations on the bearing, the map being registered and updated throughout at least an interval of the lifetime of the bearing,
identifying an incipient damage in the bearing each time the distribution of the points in said map is not random, generating an incipient damage warning message.

With "an interval of the lifetime of the bearing" it is meant a significant percentage the total lifetime of the bearing, which is conveniently identified and which could be coincident with the total lifetime of the bearing.

The method of the present embodiments of the invention achieves the following advantages:
it can be performed periodically, i.e. no continuous monitoring is required,
it can be performed remotely,
it can be used to perform prognostics of failures, i.e. to identify in advance parameters and/or conditions that may lead to a damage, before the damage is present.

According to the present embodiments of the invention, the clustering of located indentations can be detected at different times over the bearing lifetime. Every time an incipient damage develops, it will be detected more times at the same location, thus generating a not-random distribution of the points in the map.

After such parameters and/or conditions are identified, the remaining useful lifetime (RUL) of the bearing can be better estimated and allows, for example, to better plan the maintenance of the bearing, e.g. the bearing may be changed in the low wind season instead of in the high wind season.

Advantageously, the method of the present embodiments of the invention may be used to increase the life of bearing, thus leading to significant cost savings.

Optionally, the method may further include the step of generating a lubrication contamination message when the distribution of the points in said map is random, i.e. when indentation are present, but no incipient damage warning message is being generated because no faulty condition is being detected.

According to an exemplary embodiment of the present invention, an incipient damage in the bearing is identified each time at least a portion of the plurality of points in said map are grouped in a cluster. The presence of a cluster identifies the deviation from a random distribution.

According to another exemplary embodiment of the present invention, the map of points is subdivided in a plurality of areas, to facilitate the identification of any cluster of points. An incipient damage in the bearing is identified each time at least a cluster of points is present in at least one of said plurality of areas.

According to yet another exemplary embodiment of the present invention, the step of locating the plurality of indentations includes measuring the periodicity of the plurality of bursts for determining if each indentation is present on a roller or on an inner race or on an outer race of the bearing. This is based on the fact that, in some applications the inner race of the bearing is fixed while the rollers and the outer race rotate, but at different respective speeds, while in other applications the outer race of the bearing is fixed while the rollers and the inner race rotate.

Locating the plurality of indentations precisely on the rollers or on the races may include measuring the time delay between at least two signals of said plurality of signals. Each signal provided by a respective sensor may include a plurality of peaks corresponding to the plurality of burst caused by the plurality of indentations. The analysis of the delay between two peaks on two different signals, the two peaks being both associated to the same burst and the same indentation, may be used to identify the position of the respective indentation.

According to yet another exemplary embodiment of the present invention, the step of locating the plurality of indentations on a roller or on an outer race, i.e. on rotational elements of the bearing, includes a Kalman filter. The Kalman filter may improve the accuracy of locating the plurality of indentations.

BRIEF DESCRIPTION

Some of the embodiments will be described in detail, with reference to the following figures, wherein like designations denote like members, wherein:

FIG. 4 shows a block diagram, illustrating the method of the present invention.

DETAILED DESCRIPTION

Figure 1:
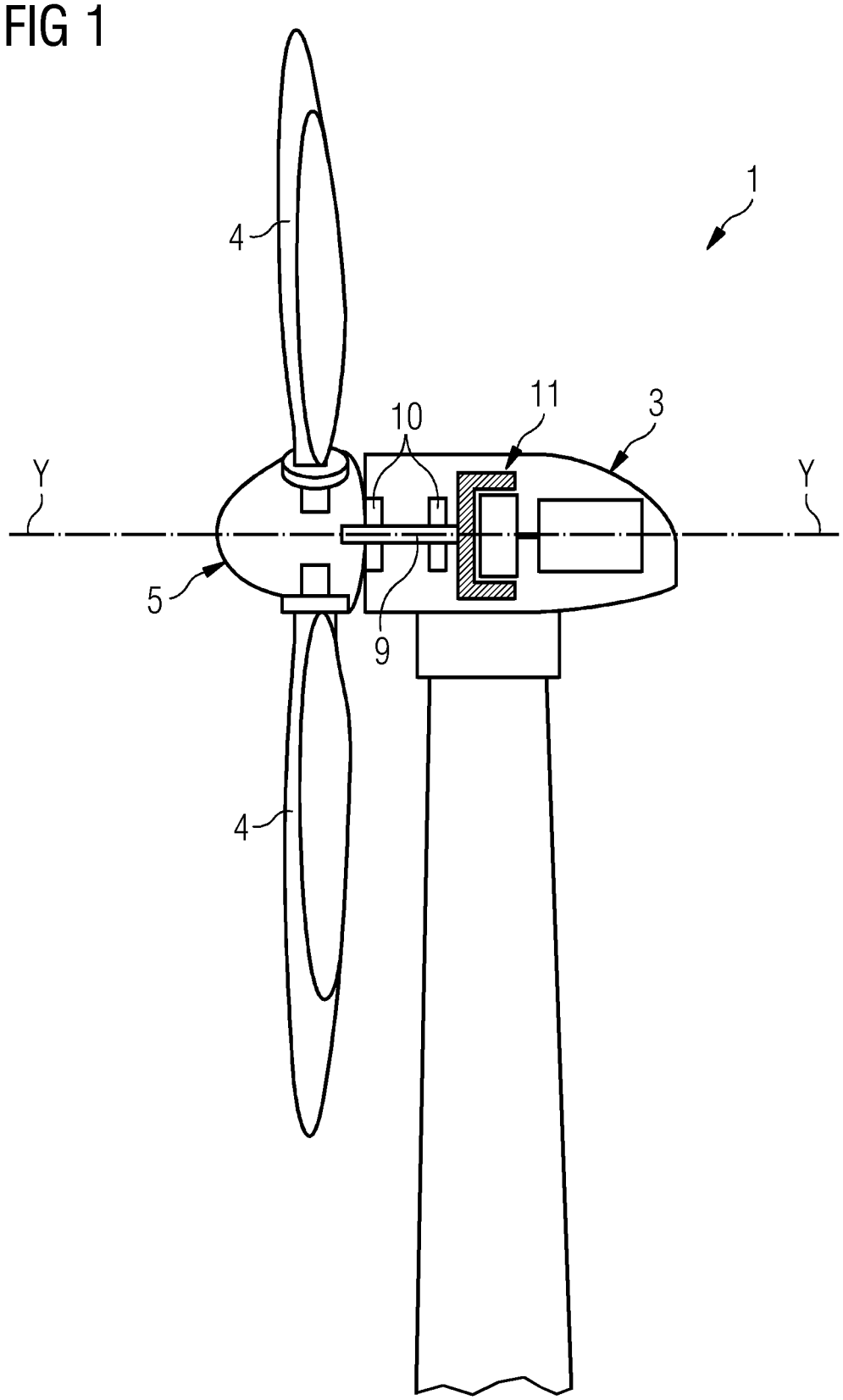
FIG. 1 shows a partial longitudinal section view of a wind turbine comprising a plurality of bearings, whose failures may be detected according to the method of the present invention.

FIG. 1 shows a wind turbine 1. The wind turbine 1 comprises a tower 2, which is mounted on a non-depicted fundament. A nacelle 3 is arranged on top of the tower 2.

The wind turbine 1 further comprises a wind rotor 5 having two, three or more blades 4 (in the perspective of FIG. 1 only two blades 4 are visible). The wind rotor 5 is rotatable around a rotational longitudinal axis Y. The blades 4 extend radially with respect to the rotational axis Y.

The wind turbine 1 comprises a permanent magnet electric generator 11 including a stator and a rotor.

According to other possible embodiments of the present invention (not represented in the attached figures), the present invention may be applied to any other type of permanent magnet machine with either internal or external rotor.

The wind rotor 5 is rotationally coupled with the permanent magnet generator 11 either directly, e.g. direct drive or by means of a rotatable main shaft 9 and through a gear box (not shown in FIG. 1). Two schematically depicted bearings 10 are provided in order to hold in place the main shaft 9 and the rotor 5. The rotatable main shaft 9 extends along the rotational axis Y.

The method for detecting an incipient damage in a bearing may be applied to the bearings 10 of the the main shaft 9 of the wind turbine 1 or to any other bearing, whose monitoring is required.

Figure 2:
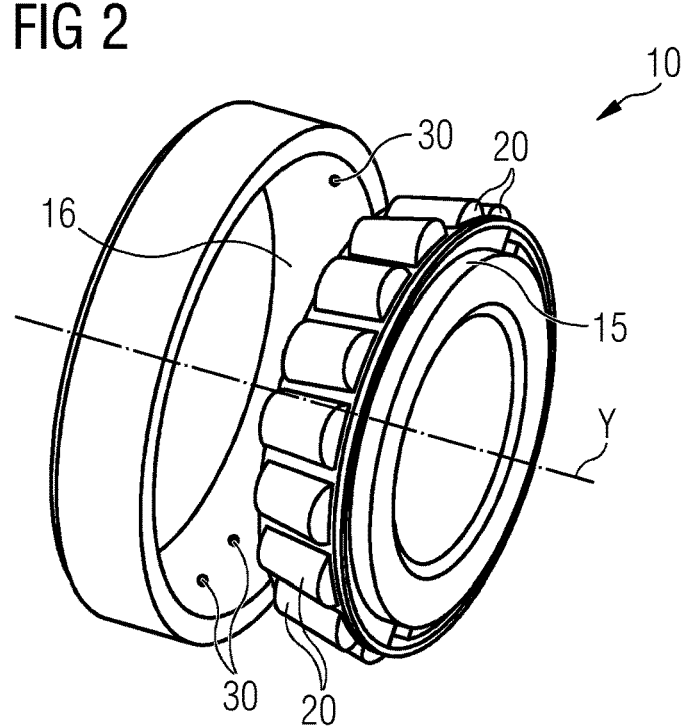
FIG. 2 shows a bearing to which the method of the present invention is applied.

FIG. 2 shows a schematic representation of a bearing 10, to which the method of the present invention is applied.

The bearing 10 includes a plurality of rollers 20 between an inner race 15 and an outer race 16. The rollers 20 rotate around respective central axis and also around the rotational longitudinal axis Y for allowing a relative rotation between the fixed inner race 15 and the outer race 16, which rotates around the rotational longitudinal axis Y.

According to another possible embodiment of the present invention, the inner race 15 rotates around the rotational longitudinal axis Y and the outer race 16 is fixed.

When a particle is crushed or rolled in the bearing 10, a small indentation 30 is created in the bearing 10 on the rollers 20 and/or on the inner race 15 and/or on the outer race 16. When the bearing is rotating, a strong so-called after effect Acoustic Emission (AE) burst is emitted every time the roller is passing the indentation. Over time the burst will reduce in strength and eventually disappear. The AE burst permits to identify the indentations 30. For detecting the AE bursts, a plurality of sensors (not represented in the attached figures) are mounted on the bearing 10. In FIG. 2 a plurality of indentations 30 on the external race 16 are shown.

Figure 3:
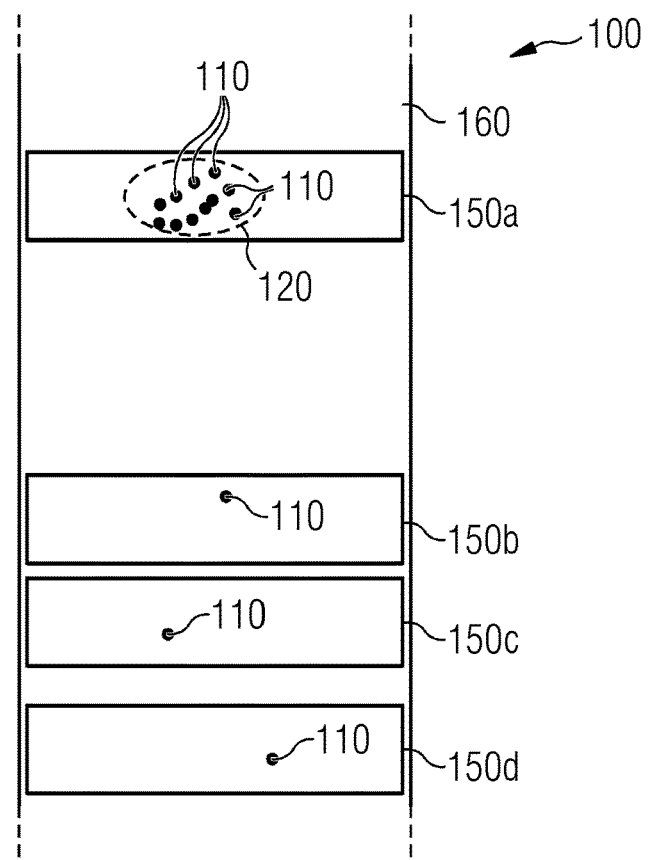
FIG. 3 shows a digital model of the bearing used in the method of the present invention.

With reference to FIG. 3 and FIG. 4, the steps of a computer implemented method 200 for detecting an incipient damage in the bearing 10 are described. The method 200 comprises a first step 210 of receiving from the plurality of sensors of the bearing 10 a plurality of signals corresponding to a plurality of AE bursts. Each burst is emitted when the bearing rotates each time an indentation 30 is met during the rotation of the bearing 10 at a contact point between a roller 20 and the inner race 15 or at a contact point between a roller 20 and the outer race 16.

After the first step 210, the method 200 comprises a second step 220 of analysing the plurality of signals from the sensors for locating on the bearing 10 the plurality of indentations 30 corresponding to the plurality of bursts.

The indentation may be present on one or more rollers 20 and/or on the inner race 15 and/or on the outer race 16. Determining if each indentation is present on a roller 20 or on the inner race 15 or on an outer race 16 can be determining by measuring the periodicity of the plurality of bursts in each signal provided by sensors. The periodicity of the bursts corresponding to the same indentation 110, present on the inner race 15 (which is fixed) or on the rollers 20 or on the outer race 16 (which rotates, but with respective different rotational speeds) is predetermined by the bearing geometrics and is proportional to the rotational speed.

Locating the plurality of indentations 30 includes measuring the time delay between at least two signals of the plurality of signals measured through the sensors. Each signal provided by a respective sensor may include a plurality of peaks corresponding to the plurality of burst caused by the plurality of indentations 30. The analysis of the delay between two peaks on two different signals, the two peaks being both associated to the same burst and the same indentation 30, may be used to identify the distance of the indentation 30 from the sensors, i.e. the position of the indentation on the bearing 10.

Considering that the rollers 20 and the outer race 16 rotate, locating the plurality of indentations 30 on such elements can be efficiently performed by using a Kalman filter.

After the second step 220, the method 200 comprises a third step 230 of generating a map of points 110 on a digital model 100 of the bearing 10, each point 110 corresponding to an indentation 30 on the bearing 10. The map of points 110 is registered and updated throughout at least an interval of the lifetime of the bearing, so that the map includes all historical points 110 identified during such time interval, each point 110 corresponding to an indentation 30 that is or previously has been detected on the bearing 10.

FIG. 3 shows a partial representation of the digital model 100 including only a digital representation of the outer race 16 of FIG. 2, where a plurality of historical detected indentations 30 are present.

The map of points 110 is subdivided in a plurality of areas (four areas 150a-d are shown in FIG. 3)

After the third step 230, the method 200 comprises a fourth step 240 of checking if the distribution of the points 110 in the map is random.

In particular, the fourth step of the method may include checking if the distribution of the points 110 is randomly spread across the areas 150*a-d* comprising the map of the points 110.

If the distribution of the points 110 in the map is not random, the method continues with a fifth step 250 of identifying an incipient damage in the bearing 10 and generating an incipient damage warning.

Lack of randomness is identified by a cluster 120 of points 110 present in the same area 150*a* of the map of point 110 shown on FIG. 3.

Alternatively, to the fifth step 250, if the distribution of the points 110 in the map is random, the method continues with a sixth step 260 of generating a lubrication contamination message.

If no indentations are detected or the rate/time delay between the detected indentations is long, the method could further provide a message to make it evident that no critical conditions are being reached.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer implemented method for detecting an incipient damage in a bearing, the method comprising:
   receiving from a plurality of sensors of the bearing a plurality of signals corresponding to a plurality of bursts, each burst being emitted each time an indentation is met during a rotation of the bearing at a contact point between a roller of the bearing and a race of the bearing;
   analyzing the plurality of signals for locating on the bearing a plurality of indentations corresponding to the plurality of bursts;
   generating a map of points on a digital model of the bearing corresponding to the plurality of indentations on the bearing, the map of points being registered and updated throughout at least an interval of a lifetime of the bearing;
   identifying the incipient damage in the bearing each time a distribution of the points in the map is not random; and
   generating an incipient damage warning message.

2. The computer implemented method according to claim 1, wherein the incipient damage in the bearing is identified each time at least a portion of of points in the map are grouped in a cluster.

3. The computer implemented method according to claim 2, wherein the map of points is subdivided in a plurality of areas and wherein the incipient damage in the bearing is identified each time at least a cluster of points is present in at least one of the plurality of areas.

4. The computer implemented method according to claim 1, wherein the locating the plurality of indentations includes measuring a periodicity of the plurality of bursts for determining if each indentation is present on a roller or on an inner race or on an outer race of the bearing.

5. The computer implemented method according to claim 1, wherein the locating the plurality of indentations includes measuring a time delay between at least two signals of the plurality of signals.

6. The computer implemented method according to claim 1, wherein the locating the plurality of indentations on a roller or on an outer race of the bearing includes a Kalman filter.

7. The computer implemented method according to claim 1, further comprising generating a lubrication contamination message when the distribution of the points in the map is random.

8. The computer implemented method according to claim 1, wherein the method is performed periodically.

* * * * *